(12) United States Patent
Kemeny

(10) Patent No.: US 12,409,679 B2
(45) Date of Patent: Sep. 9, 2025

(54) WHEEL ASSEMBLY INCLUDING AXLE ATTACHMENT ASSEMBLY HAVING ROTATIONALLY SPACED INBOARD AND OUTBOARD ARCUATE ARMS AND RELATED METHODS

(71) Applicant: GACW Incorporated, Chandler, AZ (US)

(72) Inventor: Zoltan Kemeny, Chandler, AZ (US)

(73) Assignee: GACW INCORPORATED, Chandler, AZ (US)

( * ) Notice: Subject to any disclaimer, the term of this patent is extended or adjusted under 35 U.S.C. 154(b) by 645 days.

(21) Appl. No.: 17/831,218

(22) Filed: Jun. 2, 2022

(65) Prior Publication Data

US 2023/0391135 A1  Dec. 7, 2023

(51) Int. Cl.
*B60B 9/24*  (2006.01)
(52) U.S. Cl.
CPC ...................... *B60B 9/24* (2013.01)
(58) Field of Classification Search
CPC ...................................... B60B 9/24
See application file for complete search history.

(56) References Cited

U.S. PATENT DOCUMENTS

| 911,975 | A | | 2/1909 | Gustafson | |
|---|---|---|---|---|---|
| 1,081,551 | A | * | 12/1913 | Pearl | B60B 9/20 152/62 |
| 1,601,518 | A | | 9/1926 | Weston | |
| 1,808,886 | A | | 6/1931 | Courtney | |
| 1,979,935 | A | | 11/1934 | Henap | |
| 4,428,567 | A | | 1/1984 | Fournales | |
| 6,041,838 | A | | 3/2000 | Al-Sabah | |
| 6,698,480 | B1 | | 3/2004 | Cornellier | |
| 10,987,969 | B2 | * | 4/2021 | Kemeny | B60C 7/08 |
| 10,987,970 | B2 | * | 4/2021 | Kemeny | B60B 9/24 |
| 10,987,971 | B2 | * | 4/2021 | Kemeny | B60B 9/24 |
| 11,135,871 | B2 | * | 10/2021 | Kemeny | B60B 9/24 |
| 11,173,744 | B2 | * | 11/2021 | Kemeny | B60B 9/26 |

(Continued)

FOREIGN PATENT DOCUMENTS

| NO | 2020047609 | 3/2020 |
|---|---|---|
| WO | 2020236476 | 11/2020 |
| WO | 2021071805 | 4/2021 |

*Primary Examiner* — Jason R Bellinger
(74) *Attorney, Agent, or Firm* — ALLEN, DYER, DOPPELT + GILCHRIST, P.A.

(57) ABSTRACT

A wheel assembly for coupling to an axle may include an outer rim, distal inboard attachment points coupled to the outer rim, and distal outboard attachment points coupled to the outer rim. The wheel assembly may also include an axle attachment assembly that includes a medial portion to be coupled to the axle, rotationally spaced inboard arcuate arms extending outwardly from the medial portion and defining proximal inboard attachment points, and rotationally spaced outboard arcuate arms extending outwardly from the medial portion and defining proximal outboard attachment points. The wheel assembly may also include inboard gas springs, each coupled between respective ones of the distal inboard attachment points and the proximal inboard attachment points, and outboard gas springs, each coupled between respective ones of the distal outboard attachment points and the proximal outboard attachment points.

23 Claims, 13 Drawing Sheets

(56) References Cited

U.S. PATENT DOCUMENTS

| | | | | |
|---|---|---|---|---|
| 11,279,170 B2* | 3/2022 | Kemeny | ................... | B60B 9/02 |
| 11,458,759 B2* | 10/2022 | Kemeny | ................. | B60C 11/00 |
| 11,458,760 B2* | 10/2022 | Kemeny | ................. | B60B 9/005 |
| 11,565,552 B2* | 1/2023 | Kemeny | ................... | B60B 9/24 |
| 11,801,711 B2* | 10/2023 | Kemeny | ................... | B60B 9/02 |
| 12,145,405 B2* | 11/2024 | Kemeny | ................... | B60B 9/24 |
| 2013/0340902 A1* | 12/2013 | Kemeny | ................... | B60B 9/26 |
| | | | | 152/1 |
| 2015/0090379 A1 | 4/2015 | Kemeny | | |
| 2016/0068016 A1* | 3/2016 | Winshtein | ................. | B60B 9/24 |
| | | | | 301/6.5 |
| 2016/0363184 A1* | 12/2016 | Noguchi | ................ | F16F 9/062 |
| 2022/0297473 A1* | 9/2022 | Kemeny | ................. | E21C 31/00 |
| 2022/0297474 A1* | 9/2022 | Kemeny | ................. | B60B 9/02 |
| 2022/0371360 A1* | 11/2022 | Kemeny | ................. | B60B 9/24 |
| 2023/0106152 A1* | 4/2023 | Kemeny | .............. | B60B 27/065 |
| | | | | 301/67 |
| 2023/0286315 A1* | 9/2023 | Kemeny | .............. | F16F 9/0218 |
| 2023/0391136 A1* | 12/2023 | Kemeny | ................... | B60C 7/10 |

* cited by examiner

WHEEL ASSEMBLY INCLUDING AXLE ATTACHMENT ASSEMBLY HAVING ROTATIONALLY SPACED INBOARD AND OUTBOARD ARCUATE ARMS AND RELATED METHODS

TECHNICAL FIELD

The present invention relates to the field of wheels, and more particularly, to wheel assemblies for a vehicle and related methods.

BACKGROUND

A typical wheel may include a rim and tire surrounding the rim. The tire transfers a load of a vehicle from the axle through the wheel to the ground. Tires, for example, those found on most vehicles are pneumatic tires. In other words, a typical tire is pneumatically inflated, for example, with air or other gas, such as nitrogen. More particularly, air is injected into the space between the rim and the inside of the tire to inflate it.

During operation, being pneumatically inflated, a tire absorbs the forces as the vehicle travels over the road surface. The tire and associated inflation pressure may be selected to absorb the above-noted forces while reducing any deformation. However, in many instances, excessive forces placed on the tire may cause the tire and/or rim to deform, puncture, or blowout. Typical forces also cause tread wear of the tire, while excessive forces may also cause rapid tread wear that may lead to a shortened lifespan of the tire and decreased structural integrity of the wheel.

To address the shortcomings of pneumatic-based wheels, non-pneumatic wheels have been developed. By non-pneumatic, it is meant that air or other gas is not injected to inflate an interior volume of a tire. One approach to a non-pneumatic wheel uses mechanical springs. For example, U.S. Pat. No. 911,975 to Gustafson discloses a spring wheel. Secondary spokes are arranged in pairs between pairs of main spokes and the members of each of the secondary spokes therefore pass upon opposite sides of a corresponding pair of intersecting braces. Each of the secondary spokes includes a pair of telescoping members that are pivotally connected at its outer end to ears formed on the hub and extends at its opposite end into a corresponding member.

U.S. Pat. No. 1,601,518 to Weston discloses a resilient wheel that includes radial arms. Connection between a hub and rim members may be provided by pivot pins in outer ends of these arms that have links journaled thereon. The links are pivotally articulated with bent levers, which are in turn pivoted on bracket arms that extend inwardly from the part-circular plates, which are mounted on an inner periphery of a tire holding rim.

Another approach includes a disc between a wheel hub and outer rim. For example, U.S. Pat. No. 1,808,886 to Courtney also discloses a disc or sidewall between a wheel hub and a rim. The disc is engaged by studs that project from the wheel hub and extends from an outer flange obliquely to the wheel hub. The disc assists the wheel tire and rim by resisting any tendency to become displayed laterally as a result of stresses occurring while the wheel is turning.

U.S. Pat. No. 1,979,935 to Henap discloses a hydraulic spoke wheel. Each of the hydraulic spokes include telescoping sections in the form of an outer section and an inner section. The outer section has the stud projecting from one end. The inner section extends from the outer section and is equipped at its extended end with the stem.

U.S. Pat. No. 6,041,838 to Al-Sabah discloses a wheel that includes spokes positioned in a spaced apart relation to each other. Each of the spokes has a first end connected to a rim and a second end connected to a plate member tip of a hub plate member in an offset position from the respective radial axis thereof. The offset position of each of the spokes is further defined by each of the spokes being connected to a respective one of the plate member tips at a predetermined angle (e.g., less than 90-degrees) from the radial axis thereof and defining an operative offset spoke axis, which intersects the radial axis of the plate member tips at the predetermined angle.

U.S. Pat. No. 6,698,480 to Cornellier discloses shock absorbing spokes each having a central cylindrical tube. Each tube has an interior cap having an aperture and an exterior cap having an aperture. Each spoke has an interior piston, a rod with an aperture and a pin. The pin pivotably couples one of the spokes to the hub. Each spoke has an exterior piston, a rod with an aperture and a pin. The pin pivotably couples one of the spokes to the rim assembly. The interior pistons and exterior pistons divide the space within each tube into an interior chamber, an exterior chamber, and a central chamber.

Despite advances in pneumatic tire wheels, and non-pneumatic tire wheels, there is still a need for improvements in wheel technology, particularly, for large construction vehicles, or mining vehicles, for example. The expense of wheel replacement, and the downtime experienced during wheel replacement may add significant expenses to the construction or mining projects.

SUMMARY

A wheel assembly for coupling to an axle may include an outer rim, a plurality of distal inboard attachment points coupled to the outer rim, and a plurality of distal outboard attachment points coupled to the outer rim. The wheel assembly may also include an axle attachment assembly that includes a medial portion to be coupled to the axle, and a plurality of rotationally spaced inboard arcuate arms extending outwardly from the medial portion and defining a plurality of proximal inboard attachment points. The axle attachment assembly may also include a plurality of rotationally spaced outboard arcuate arms extending outwardly from the medial portion and defining a plurality of proximal outboard attachment points. The wheel assembly may further include a plurality of inboard gas springs, each coupled between respective ones of the distal inboard attachment points and the proximal inboard attachment points; and a plurality of outboard gas springs, each coupled between respective ones of the distal outboard attachment points and the proximal outboard attachment points.

The wheel assembly may also include a plurality of inboard lateral stops each coupled between a respective distal inboard attachment point and a respective proximal inboard attachment point. The plurality of inboard lateral stops may each be coupled to a same respective distal inboard attachment point as an inboard gas spring that is coupled to an adjacent rotationally spaced inboard arcuate arm, for example. The plurality of inboard lateral stops may include a plurality of inboard hinge retainers, for example.

The wheel assembly may further include a plurality of outboard lateral stops each coupled between a respective distal outboard attachment point and a respective proximal outboard attachment point. The plurality of outboard lateral stops may each be coupled to a same respective distal outboard attachment point as an outboard gas spring that is coupled to an adjacent rotationally spaced outboard arcuate arm, for example. The plurality of outboard lateral stops may include a plurality of outboard hinge retainers, for example.

The wheel assembly may also include an elastomeric body carried by an interior of the outer rim. The plurality of inboard and outboard gas springs may include associated integral hydraulic dampers operatively coupled between the axle attachment assembly and the outer rim to provide a suspension for relative movement therebetween, for example.

A method of making a wheel assembly for coupling to an axle may include coupling a plurality of distal inboard attachment points coupled to an outer rim, and coupling a plurality of distal outboard attachment points to the outer rim. The method may also include coupling each of a plurality of inboard gas springs between respective ones of the plurality of distal inboard attachment points and respective one of a plurality of proximal inboard attachment points defined by a plurality of rotationally spaced inboard arcuate arms of an axle attachment assembly extending outwardly from a medial portion of the axle attachment assembly. The method may further include coupling each of a plurality of outboard gas springs between respective ones of the plurality of distal outboard attachment points and respective ones of a plurality of proximal inboard attachment points defined by a plurality of rotationally spaced outboard arcuate arms of an axle attachment assembly extending outwardly from a medial portion of the axle attachment assembly.

DETAILED DESCRIPTION

Figure 1:
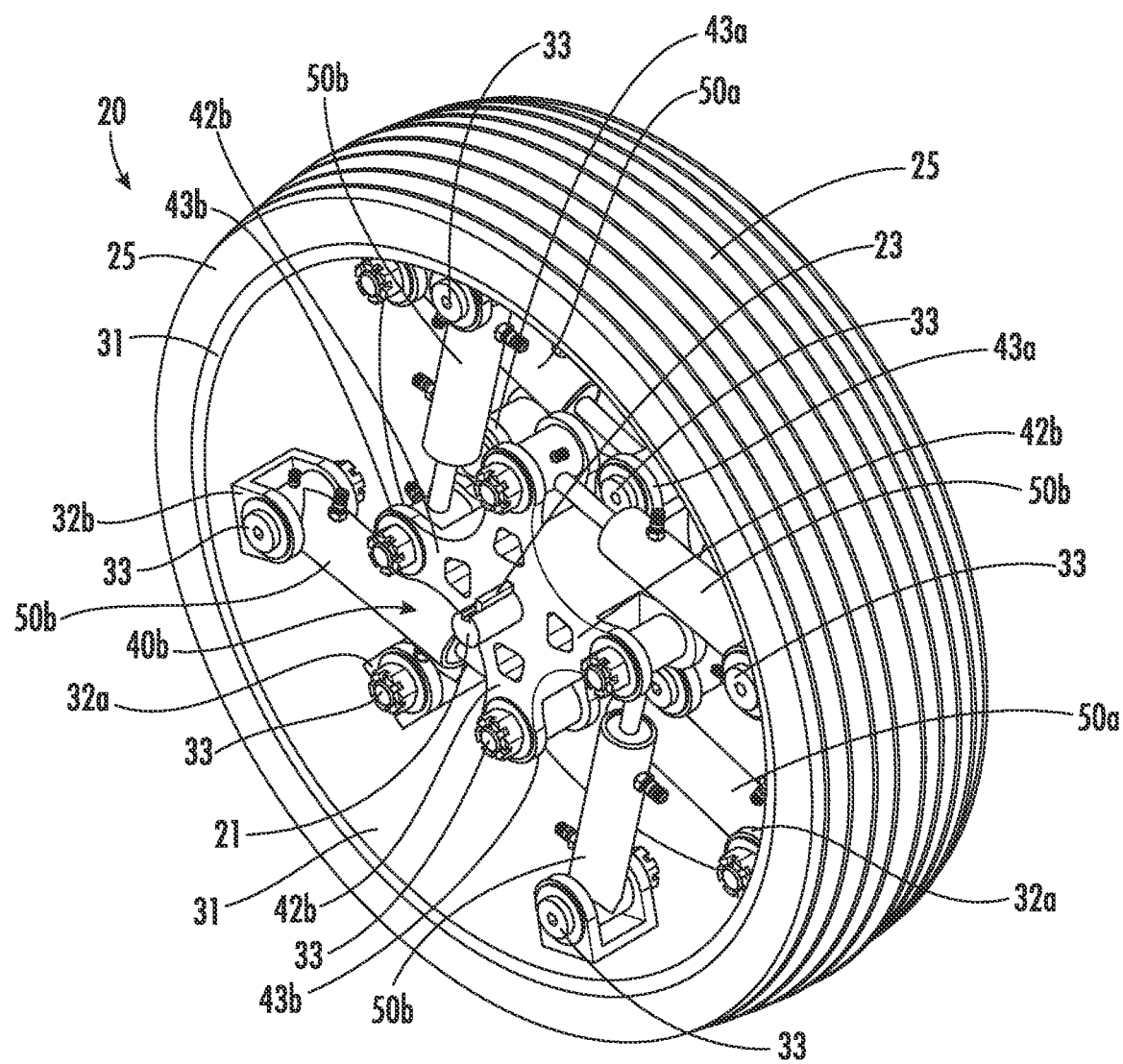
FIG. 1 is a schematic perspective view of a wheel assembly according to an embodiment.
Figure 2:
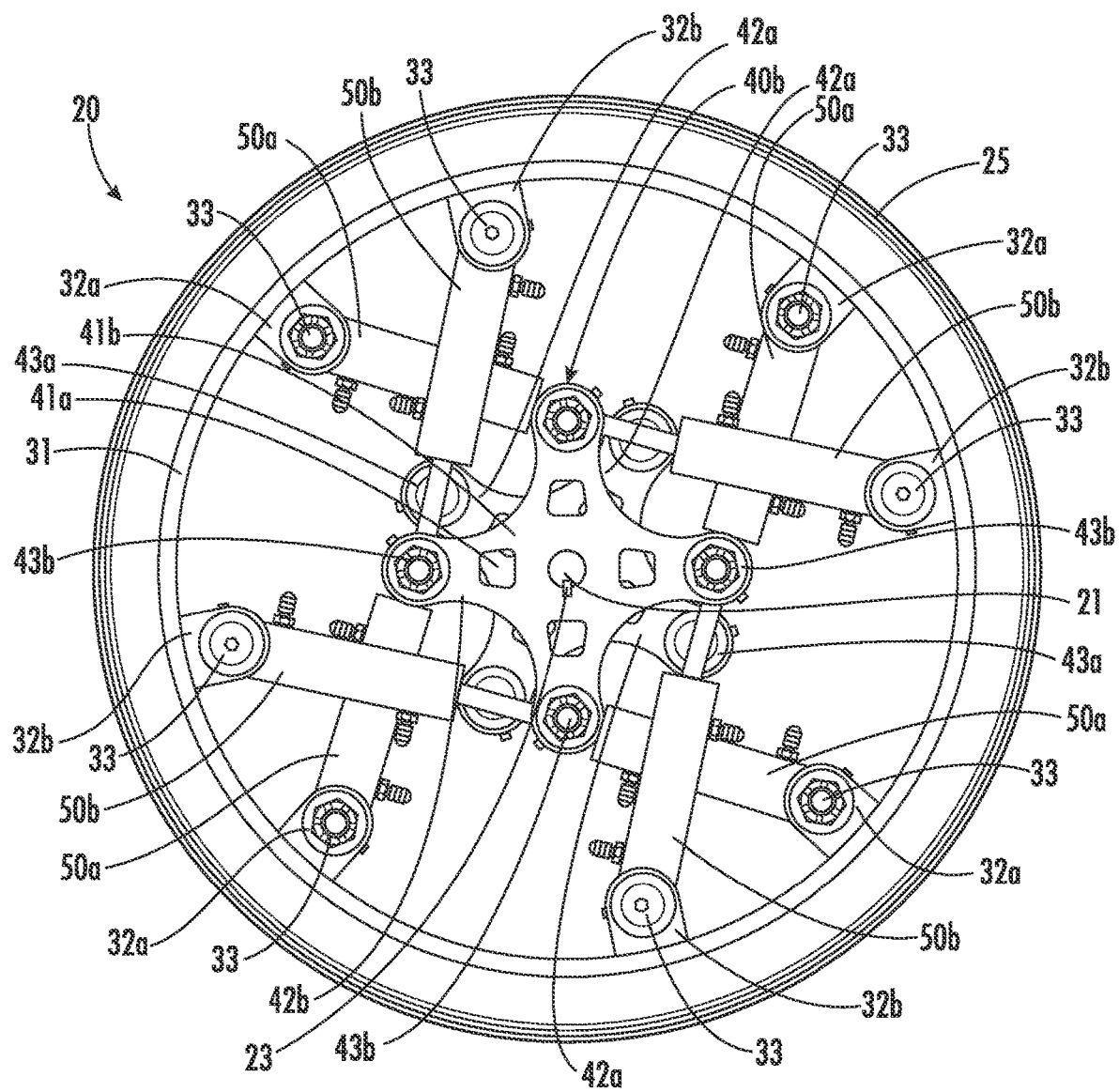
FIG. 2 is a schematic side view of the wheel assembly of FIG. 1.
Figure 3:
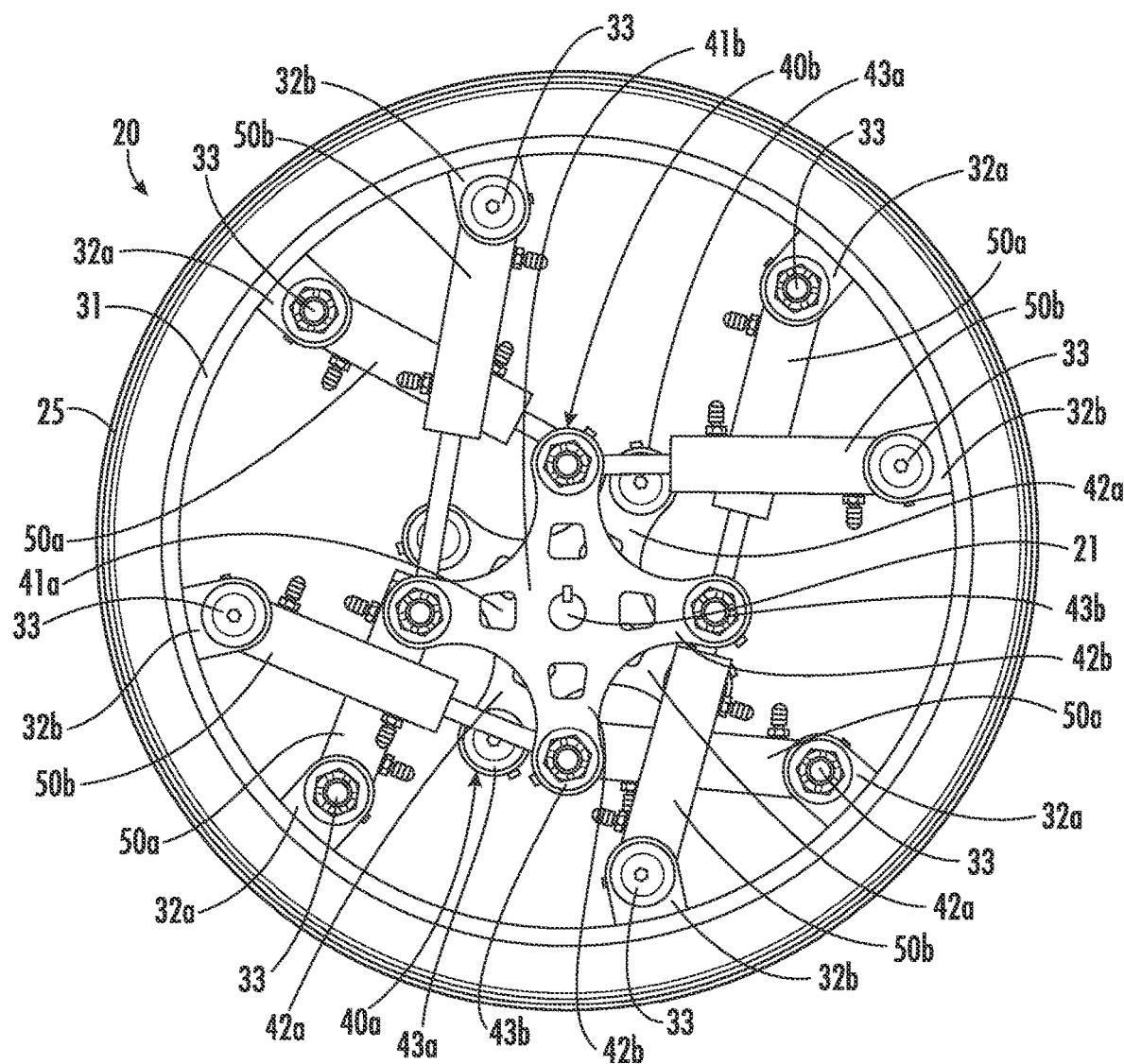
FIG. 3 is a schematic side view of the wheel assembly of FIG. 2 under displacement.
Figure 4:
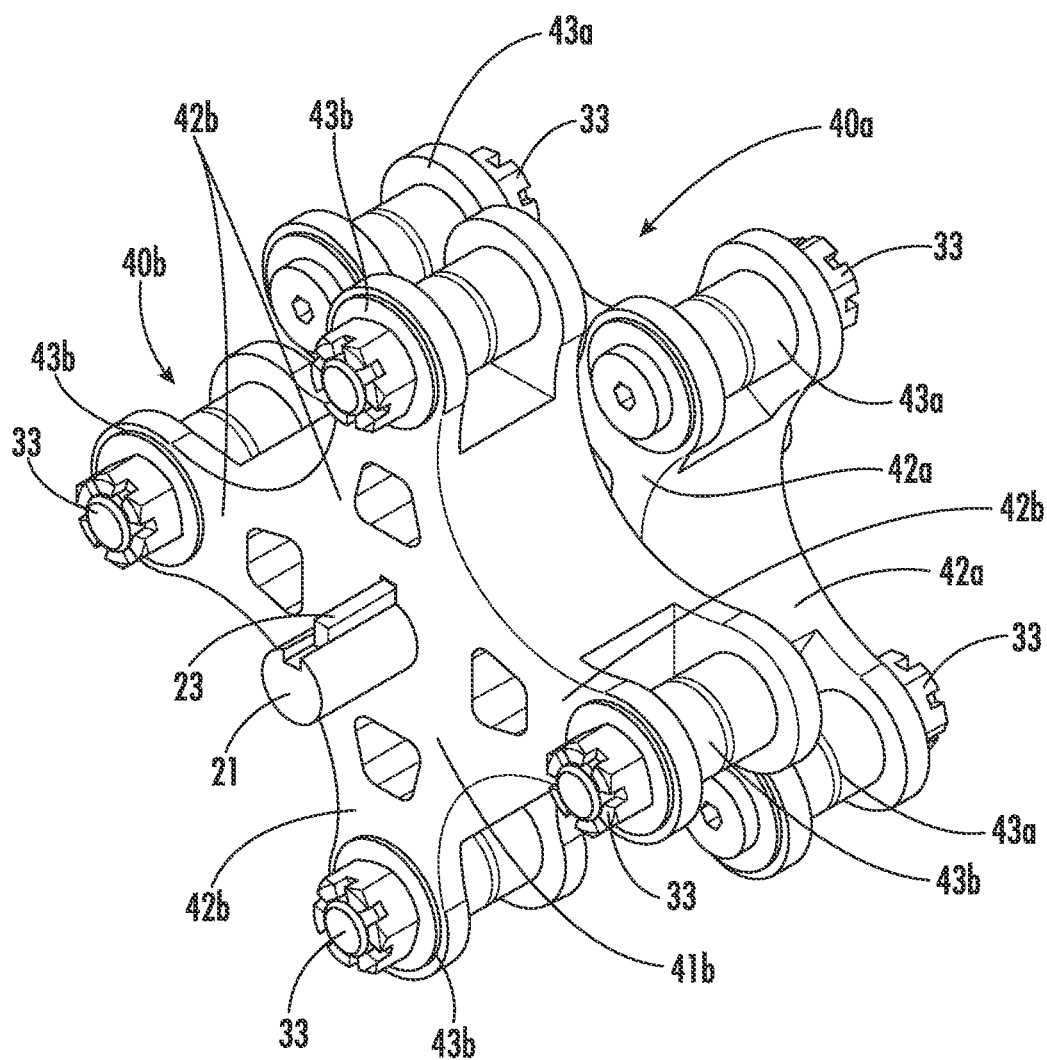
FIG. 4 is a schematic perspective view of the axle assemblies of the wheel assembly of FIG. 1.
Figure 5:
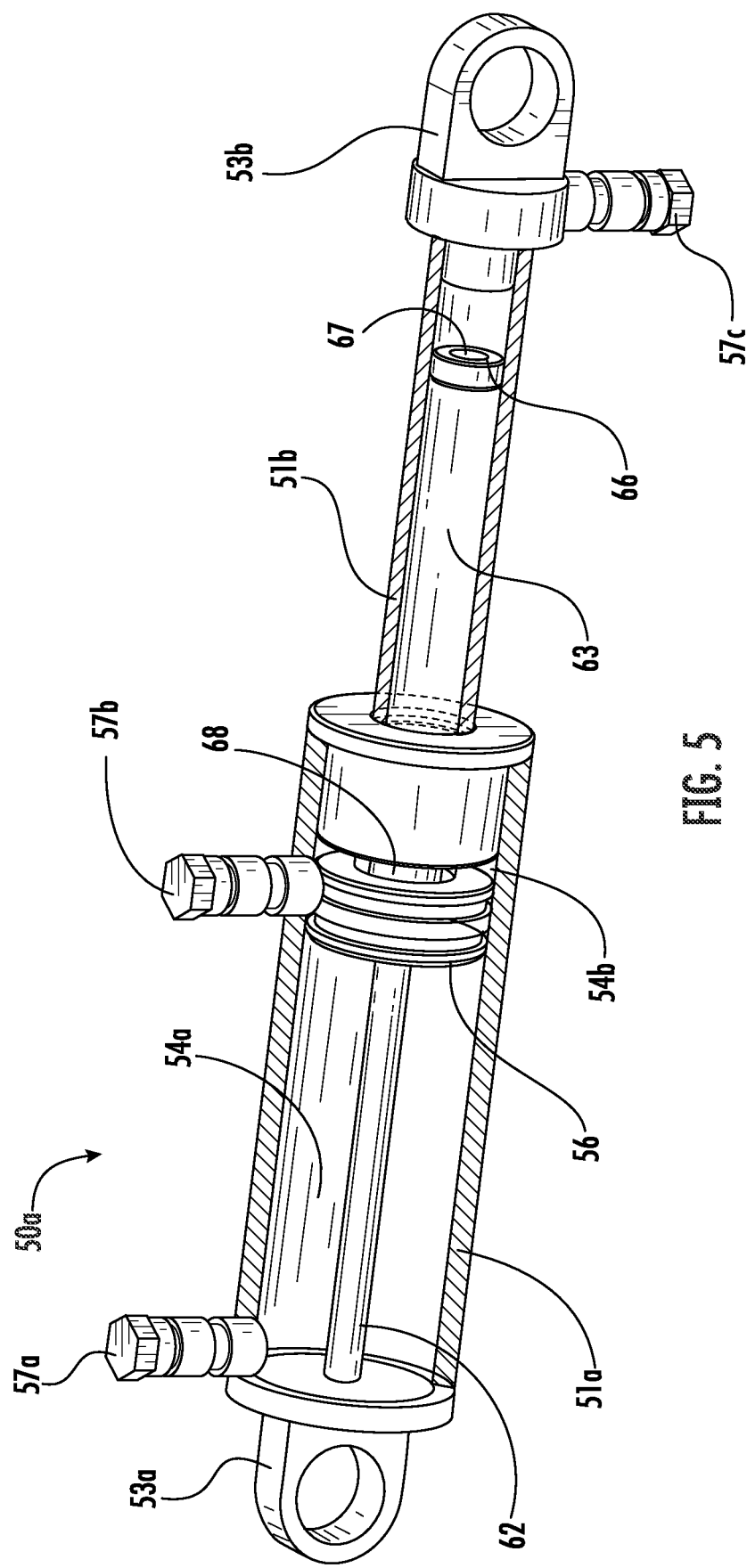
FIG. 5 is a partial cut-away view of the gas spring with associated integral hydraulic damper of the wheel assembly of FIG. 1.
Figure 6:
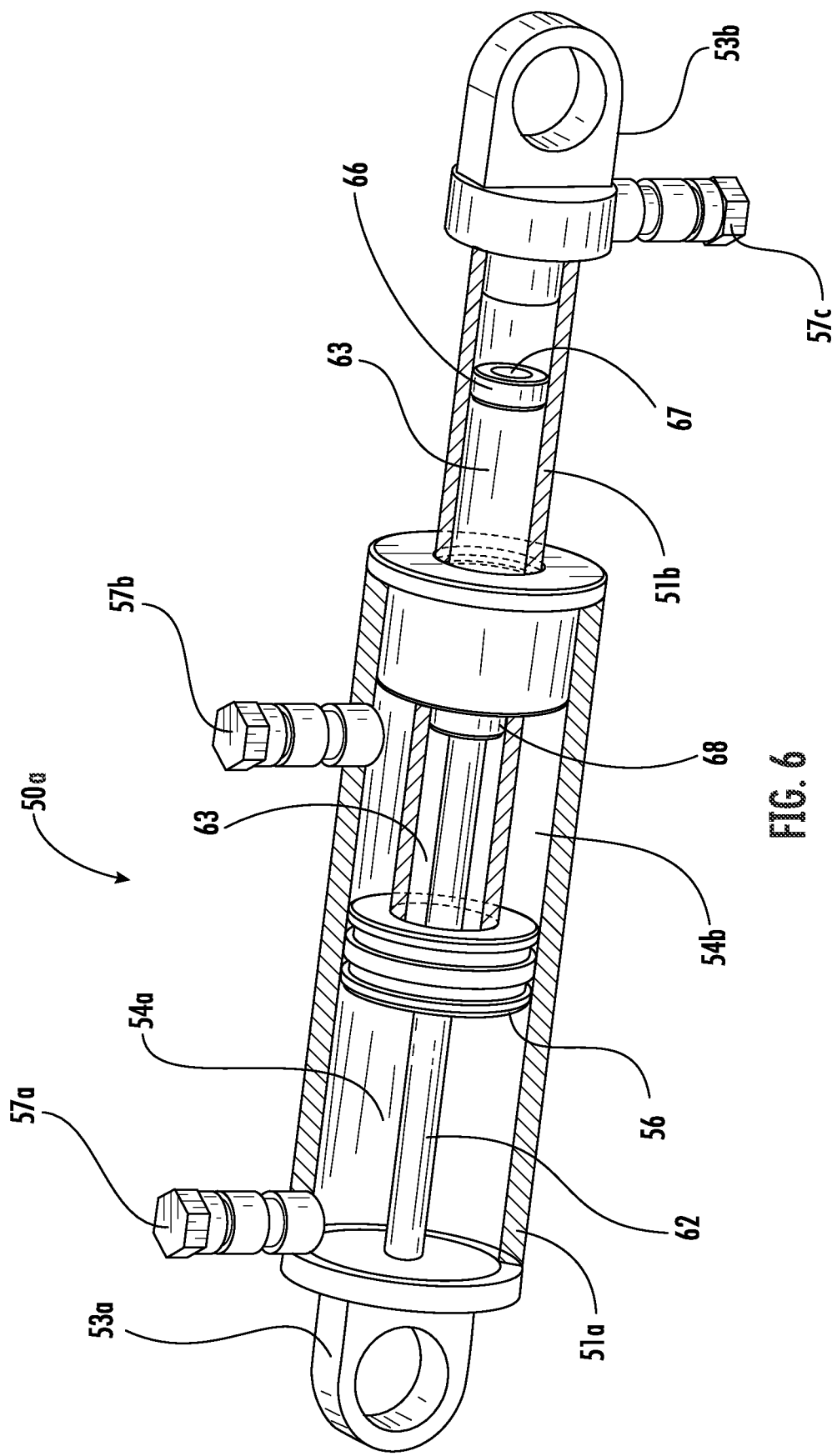
FIG. 6 is another partial cut-away view of the gas spring with associated integral hydraulic damper of the wheel assembly of FIG. 1.
Figure 7:
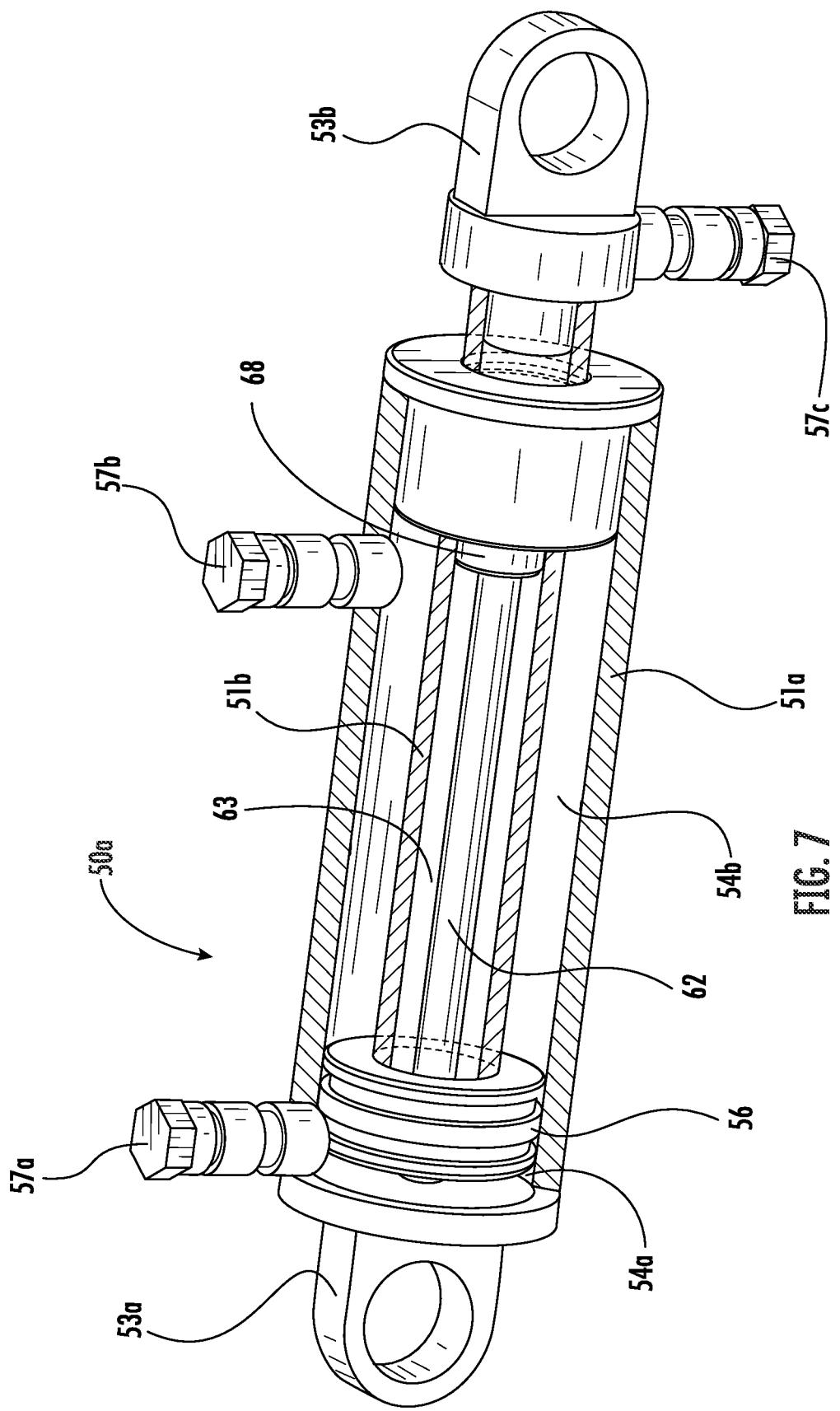
FIG. 7 is another partial cut-away view of the gas spring with associated integral hydraulic damper of the wheel assembly of FIG. 1.
Figure 8:
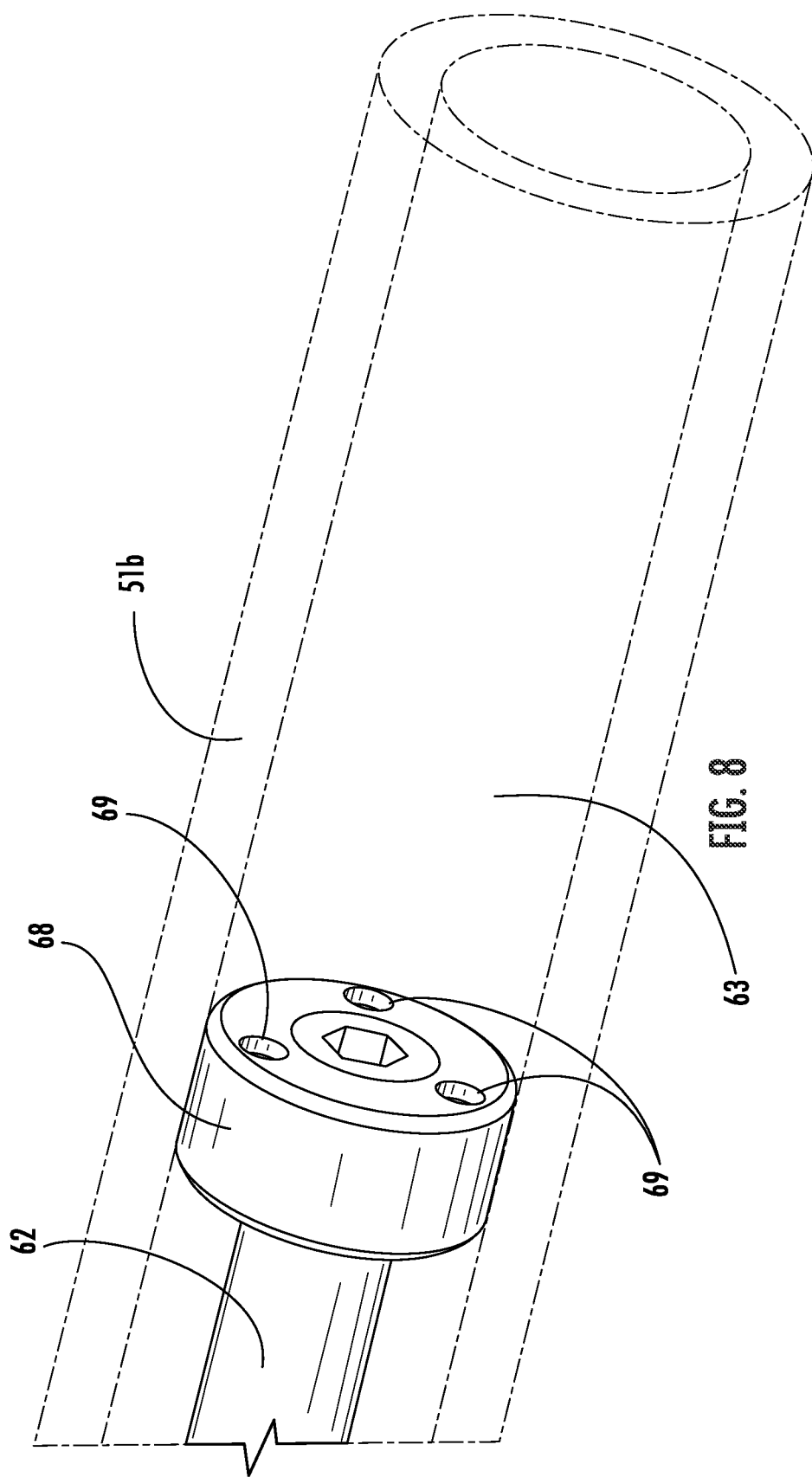
FIG. 8 is an enlarged partial cut-away view of a portion of the gas spring with associated integral hydraulic damper of the wheel assembly of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments. Prime and multiple prime notations are used to refer to like elements in different embodiments.

Referring initially to FIG. 1-4, a wheel assembly 20 may be for coupling to an axle 21, for example, of a bicycle, rickshaw, wheelchair, lawnmower, wagon, or other lightweight vehicle. The wheel assembly 20 includes an outer rim 31, for example, surrounding the axle 21. The axle 21 has a keyway therein.

A tread 25 is illustratively carried by an exterior of the outer rim 21. For example, the tread 25 may include a solid non-pneumatic tread, for example, and include rubber. Of course, the tread 25 may include another material and may have a tread pattern corresponding to a particular usage.

The wheel assembly 20 also illustratively includes distal inboard attachment points 32a coupled to the outer rim 31 and distal outboard attachment points 32b coupled to the outer rim. More particularly, the distal inboard attachment points 32a and the distal outboard attachment points 32b are carried by the outer rim 31 adjacent the inboard side of the wheel assembly 20 and the outboard side of the wheel assembly, respectively. The distal inboard and distal outboard attachment points 32a, 32b each have a U-shape to receive a respective inboard or outboard gas spring 50a, 50b. The respective gas spring 50a, 50b is secured to the corresponding distal inboard or outboard attachment point 32a, 32b via a fastener 33 (e.g., screw and nut) so that the respective inboard or outboard gas springs pivot about the fastener.

The wheel assembly 20 also includes an inboard axle attachment assembly 40a. The inboard axle attachment assembly 40a has an axle receiving opening therein to receive the axle 21 therethrough. A keyway is coupled to the axle receiving opening.

The inboard axle attachment assembly 40a illustratively includes an inboard medial portion 41a to be coupled to the axle 21. Angularly spaced inboard arms 42a, for example, equally spaced around the inboard medial portion 41a, extend outwardly from the inboard medial portion and define proximal inboard attachment points 43a for coupling to the inboard gas springs 50a. While there are illustratively four angularly spaced inboard arms 42a, there may be any number of angularly spaced inboard arms.

The wheel assembly 20 also includes an outboard axle attachment assembly 40b. The inboard axle attachment assembly 40b has an axle receiving opening therein to receive the axle 21 therethrough. A keyway is coupled to the axle receiving opening. A locking spline 23 is received within the keyways to lock the inner and outer axle attachment assemblies 40a, 40b to the axle 21 and to restrict relative rotation among the axle, the inner axle attachment assembly, and the outer axle attachment assembly.

The outboard axle attachment assembly 40b is rotationally offset from the inboard axle attachment assembly 40a. While the rotational offset of about 30-degrees is illustrated, those skilled in the art will appreciate the rotational offset may be another angle, for example, 45-degrees. The outboard axle attachment assembly 40b, similarly to the inboard axle attachment assembly 40a, includes an outboard medial portion 41*b* to be coupled to the axle 21, and angularly spaced outboard arms 42*b*, for example, equally spaced around the outboard medial portion, extending outwardly from the outboard medial portion and defining proximal outboard attachment points 43*b* for coupling to the outboard gas springs 50*b*. The rotational offset between the inboard and outboard axle attachment assemblies 40*a*, 40*b* permits inboard and outboard access to the inboard and outboard gas springs 50*a*, 50*b* at the distal inboard and distal outboard attachment points 32*a*, 32*b* and at the proximal inboard and outboard attachment points 43*a*, 43*b*.

The inboard gas springs 50*a* are each coupled between respective ones of the distal inboard attachment points 32*a* and the proximal inboard attachment points 43*a*. The outboard gas springs 50*b* are each coupled between respective ones of the distal outboard attachment points 32*b* and the proximal outboard attachment points 43*b*. The inboard and outboard gas springs 50*a*, 50*b* each have an operating stroke that defines a mechanical stop.

Each inboard and outboard gas spring 50*a*, 50*b* may be in the form of an inboard and outboard gas springs with associated integral hydraulic dampers. As will be appreciated by those skilled in the art, the gas springs with associated integral hydraulic dampers 50*a*, 50*b* provide the suspension and provide damping.

Referring now additionally to FIGS. 5-8, further details of an exemplary gas spring with associated integral hydraulic damper 50*a* (inboard or outboard) will now be described. The gas spring with associated integral hydraulic damper 50*a* includes a first cylinder body 51*a* and a second cylinder body 51*b*. The second cylinder body 51*b* is slidable within the first cylinder body 51*a*. In other words, the second cylinder body 51*b* may conceptually be considered a piston movable within with the first cylinder body 51*a*.

A first seal 56 is carried by an end of the of second cylinder body 51*b*. The first seal 56 defines first and second gas chambers 54*a*, 54*b* within the first cylinder body 51*a*. A shaft 62 is coupled to an end of the first cylinder body 51*a* and extends within the first cylinder body and into the second cylinder body 51*b*. The shaft 62 defines a hydraulic fluid chamber 63 within the second cylinder body 51*b*. Each gas spring with associated integral hydraulic damper 50*a* also includes an enlarged orifice body 68 coupled to the shaft 62 to define a hydraulic damper with the second cylinder body 51*b*. The enlarged orifice body 68 has orifices 69 therein to permit the flow of hydraulic fluid therethrough. While three orifices 69 are illustrated, there may be any number of orifices.

A flow restrictor 66 is carried within the second cylinder body 51*b*. The flow restrictor 66 illustratively includes an orifice 67 therein to permit hydraulic fluid to pass therethrough.

Gas ports 57*a*, 57*b* are respectively coupled to the first and second gas chambers 54*a*, 54*b* of each gas spring with associated integral hydraulic damper 50. A hydraulic fluid port 57*c* is coupled to the second cylinder body 51*b*. While two gas ports and one hydraulic fluid port is illustrated, those skilled in the art will appreciate that there may be more any number of gas and hydraulic fluid ports 57*a*-57*c*.

Each gas spring with associated integral hydraulic damper 50*a* also includes first and second mounting brackets 53*a*, 53*b* coupled to the first and second cylinder bodies 51*a*, 51*b*, respectively. The first and second mounting brackets 53*a*, 53*b*, similar to the mounting brackets described above, are for mounting the gas springs with associated integral hydraulic dampers 50*a* between the distal and proximal attachment points 32*a*, 43*a*.

Those skilled in the art will appreciate that the gas springs with associated integral hydraulic dampers 50*a*, 50*b* may advantageously provide a gas suspension and a damper function while saving space within the wheel assembly. More particularly, the gas springs with associated integral hydraulic dampers 50*a*, 50*b* provide this functionality by way of a Kelvin coupling mechanism, as will be appreciated by those skilled in the art.

Figure 9:
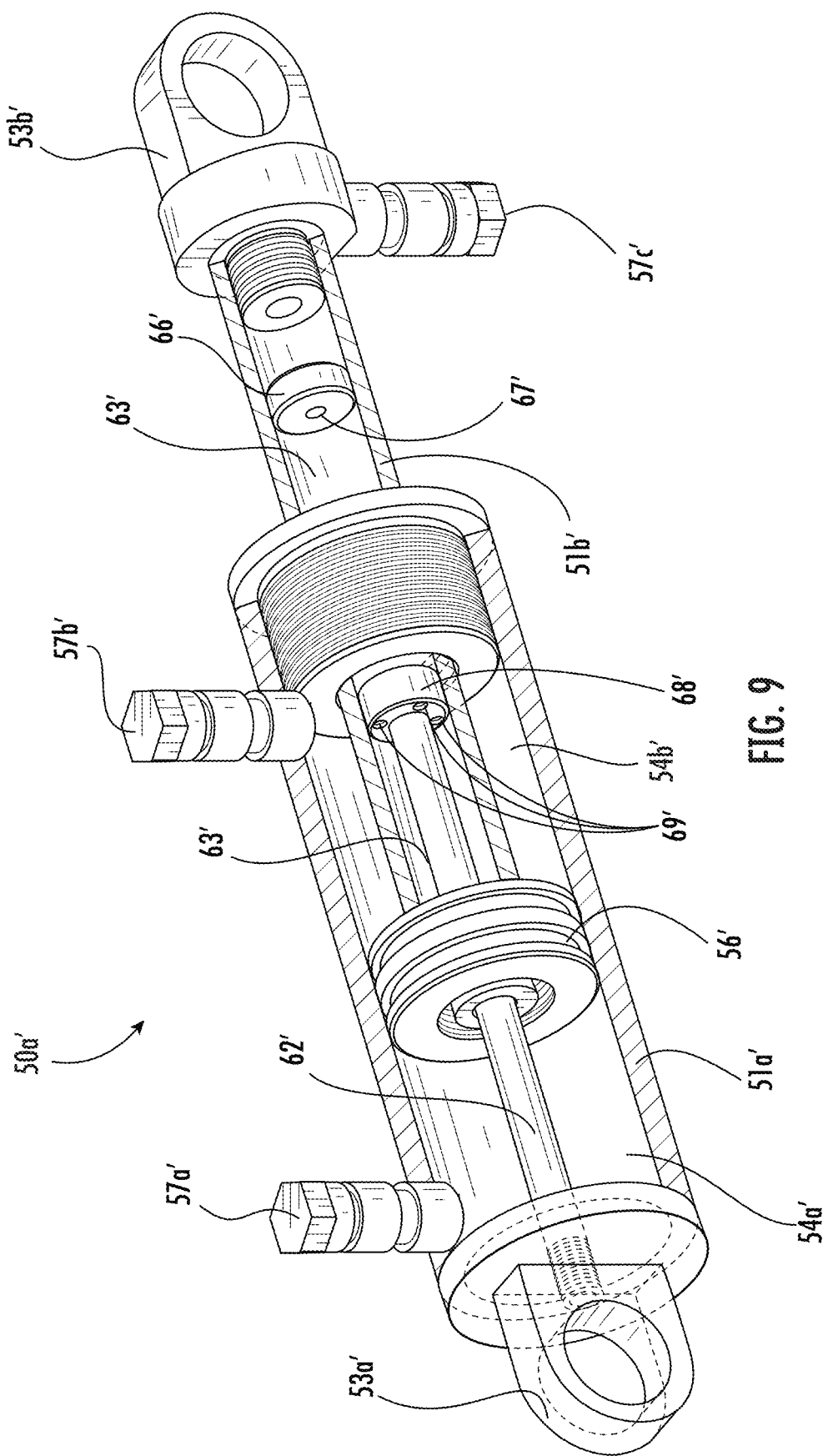
FIG. 9 is a partial cut-away view of a gas spring with associated integral hydraulic damper in accordance with another embodiment.
Figure 10:
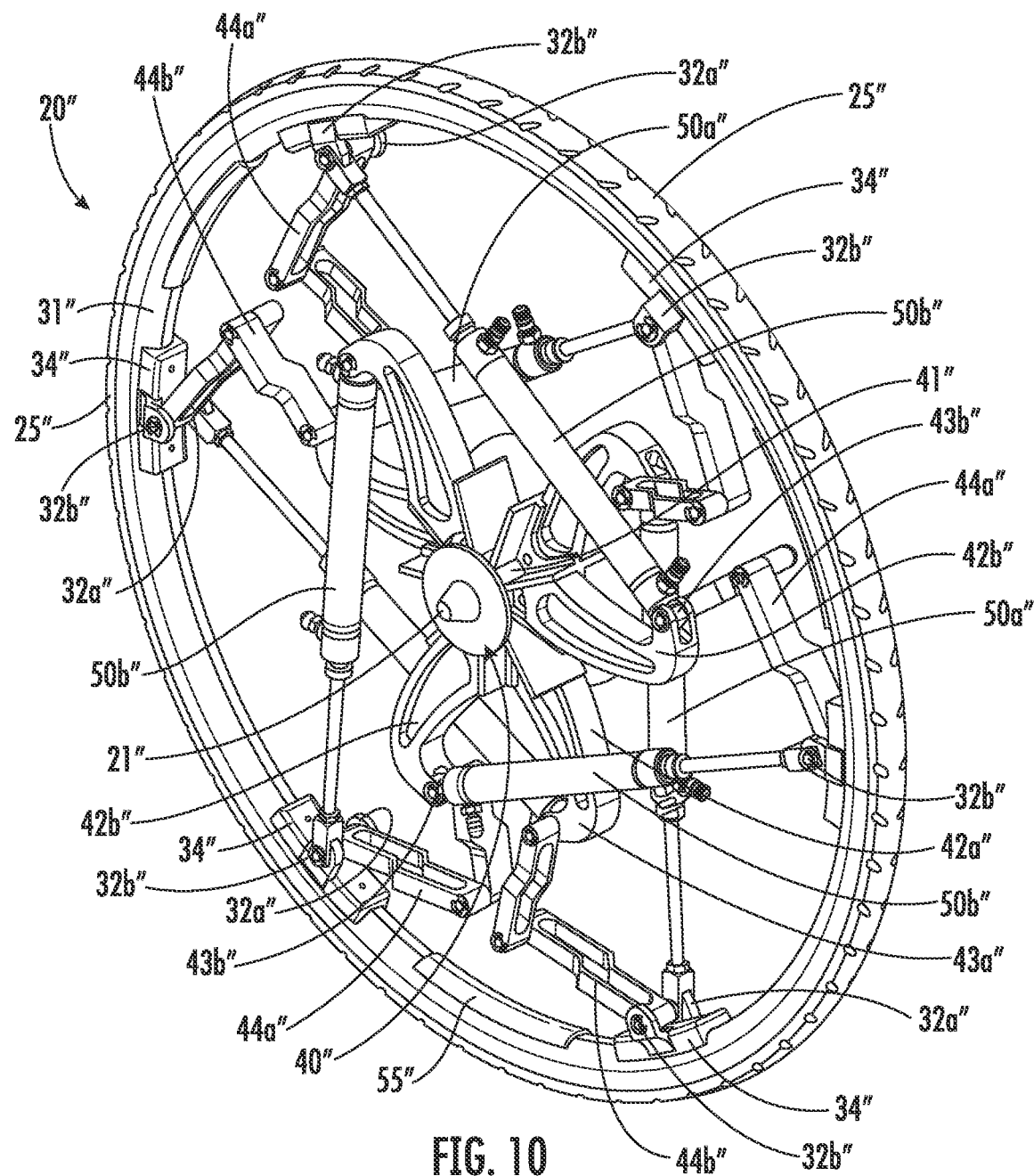
FIG. 10 is a schematic perspective view of a wheel assembly according to another embodiment.
Figure 11:
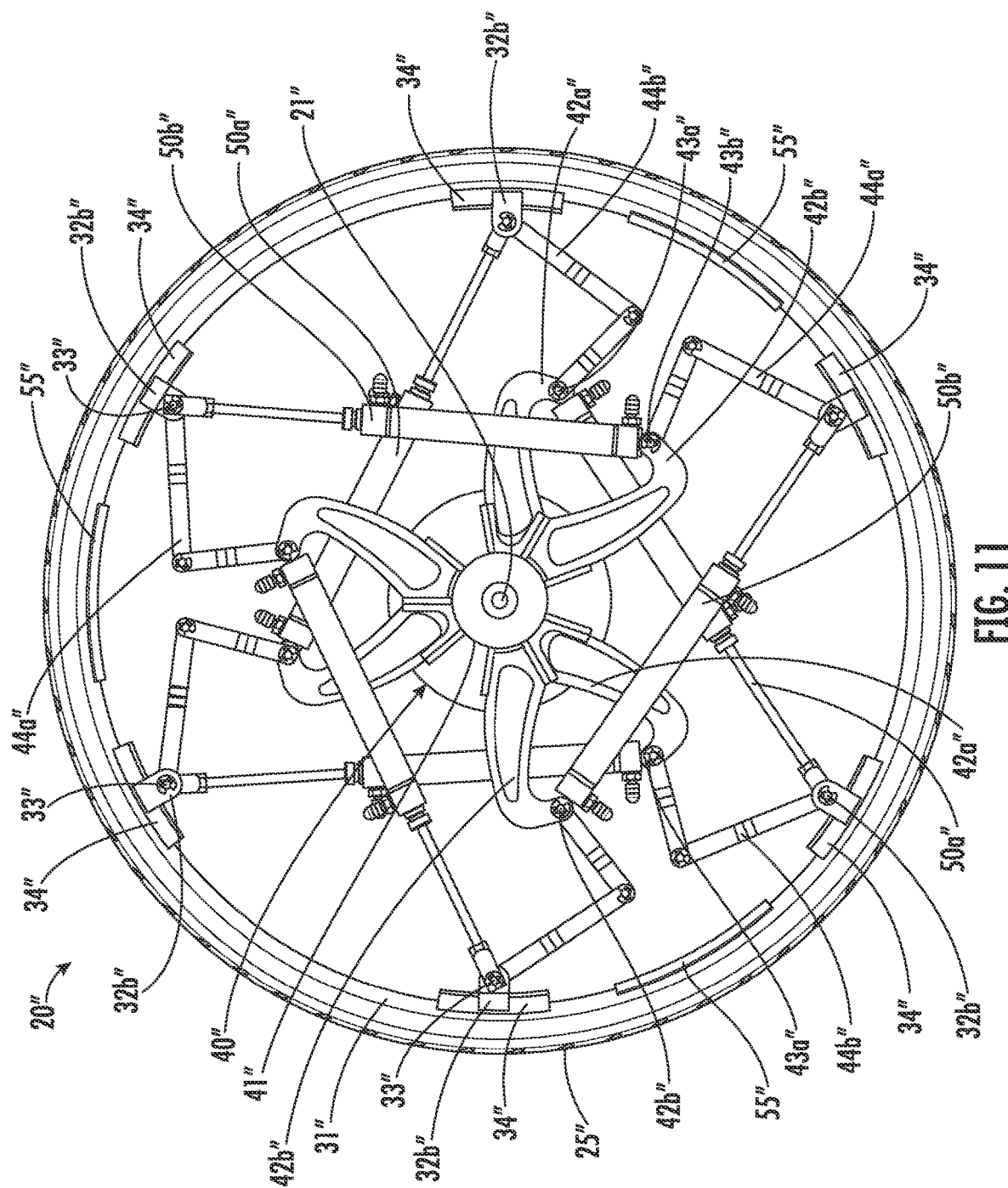
FIG. 11 is a schematic side view of the wheel assembly of FIG. 10.
Figure 12:
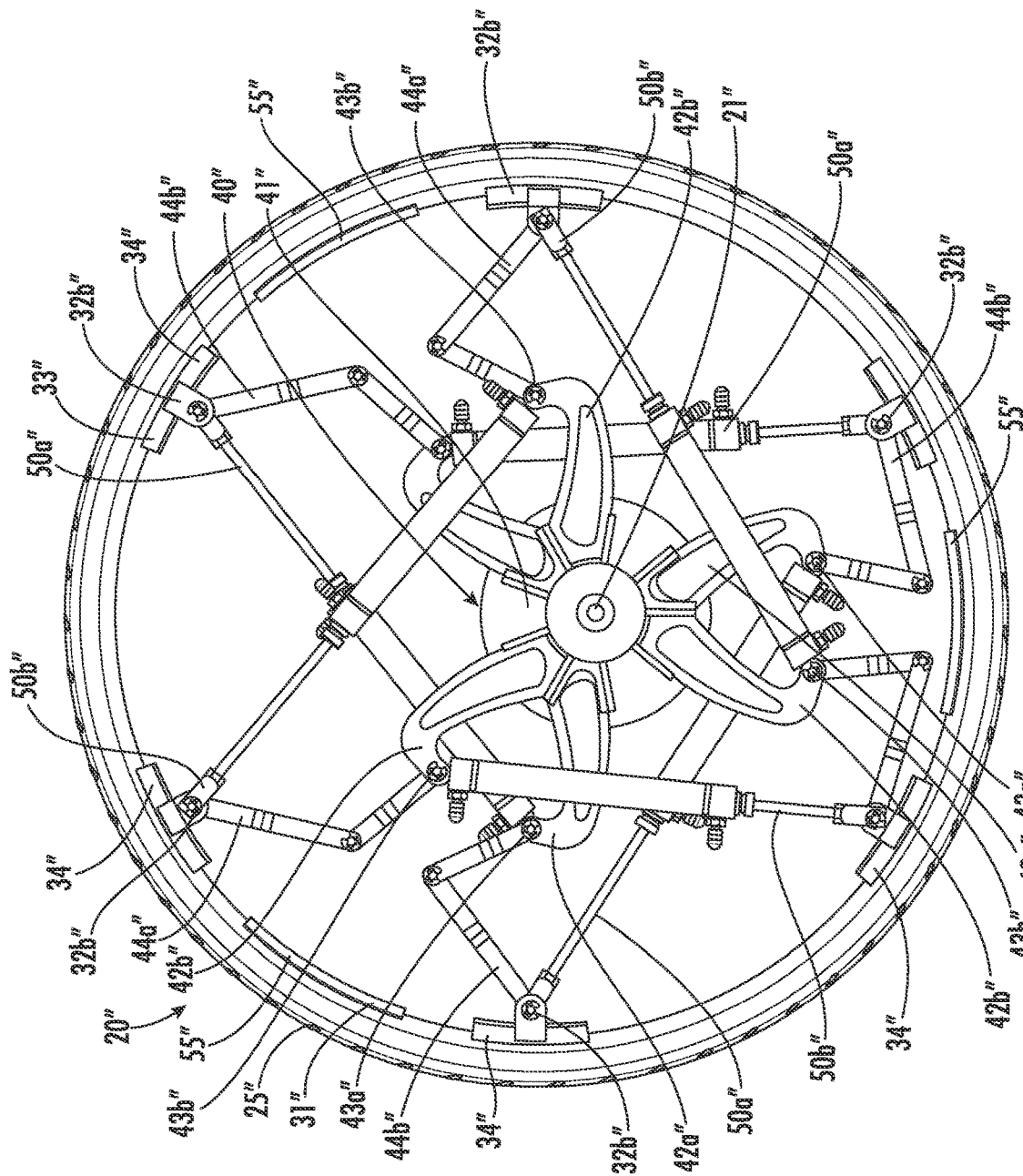
FIG. 12 is a schematic side view of the wheel assembly of FIG. 11 under displacement.
Figure 13:
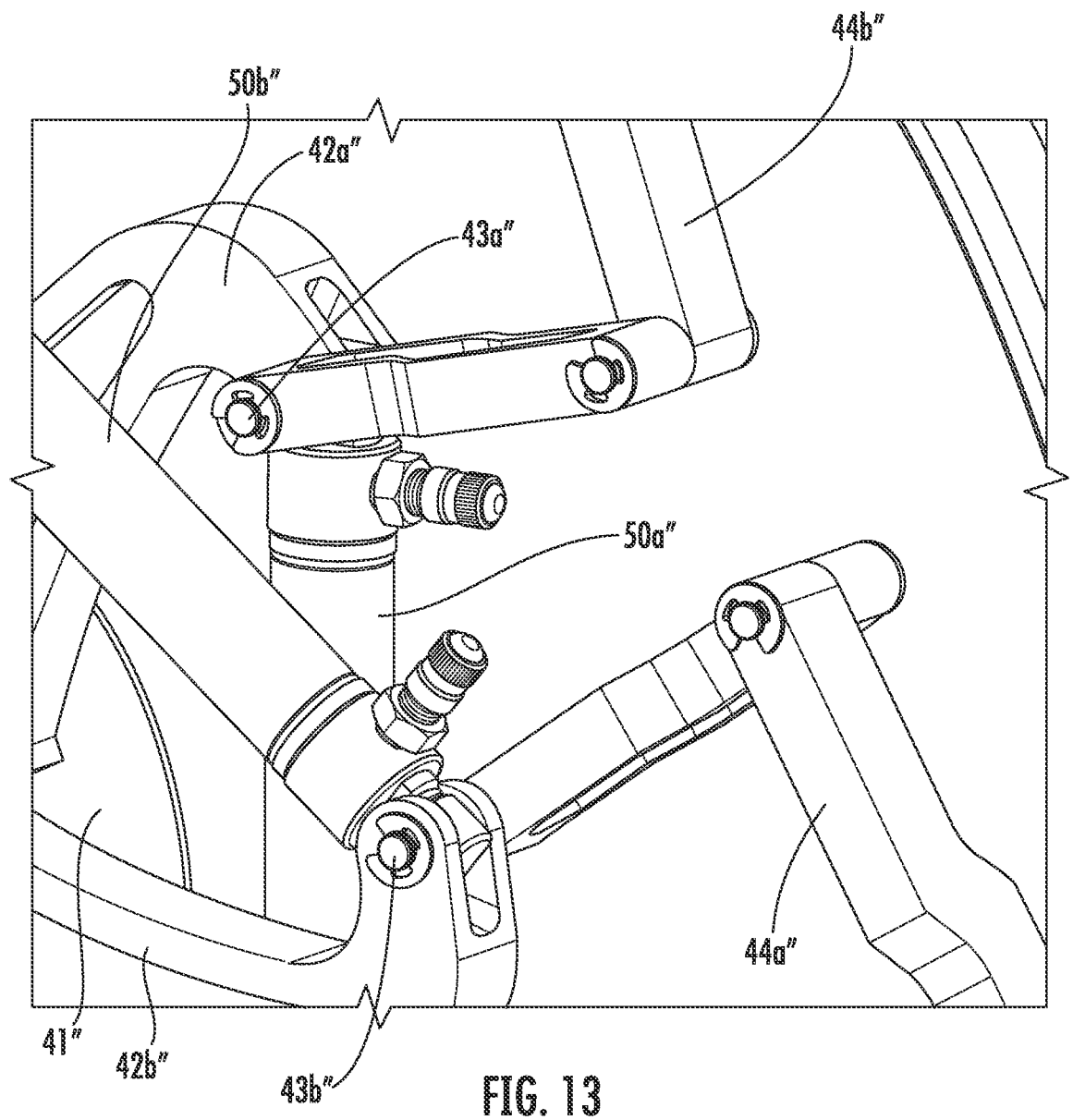
FIG. 13 is a schematic perspective view of the axle assembly of the wheel assembly of FIG. 10.

Referring briefly to FIG. 9, in another embodiment, the shaft 62', the first seal 56', an end of the first cylinder body 51*a*', and the end of the second cylinder body 51*b*' opposite the first seal may be threaded. By provided threads on the shaft 62', the first seal 56', and the ends of the first and second cylinder bodies 51*a*', 51*b*', the gas spring with its associated integral hydraulic damper 50*a*' may be adjusted for a desired response with respect to the spring and damper. A volume compensator (e.g., in the form of a reservoir and diaphragm, not illustrated) may be spring loaded, in which case, a charge post may not be desirable. Other elements illustrated but specifically described, for example, the first cylinder body 51*a*', the enlarged orifice body 68' and associated orifices 69', the first and second gas chambers 54*a*', 54*b*', the second cylinder wall 66' and associated orifice 67', the hydraulic fluid chamber 63', the ports 57*a*'-57*c*', and the first and second mounting brackets 53*a*', 53*b*' are similar to those described above. Further details of wheel assemblies including gas springs with integral dampers are describe in U.S. Patent Application Publication No. US-2020-0369079-A1, the entire contents of which are hereby incorporated by reference.

A method aspect is directed to a method of making wheel assembly 20 for coupling to an axle 21. The method includes coupling a plurality of distal inboard attachment points 32*a* to an outer rim 31 and a plurality of distal outboard attachment points 32*b* coupled to the outer rim, and coupling an inboard axle attachment assembly 40*a* to the axle, the inboard axle attachment assembly including an inboard medial portion 41*a* to be coupled to the axle and a plurality of angularly spaced inboard arms 42*a* extending outwardly from the inboard medial portion and defining proximal inboard attachment points 43*a*. The method also includes coupling an outboard axle attachment assembly 40*b* to the axle 21, the outboard axle attachment assembly being rotationally offset from the inboard axle attachment assembly 40*a* and including an outboard medial portion 41*b* to be coupled to the axle and a plurality of angularly spaced outboard arms 42*b* extending outwardly from the outboard medial portion and defining proximal outboard attachment points 43*b*. The method also includes coupling each of a plurality of inboard gas springs 50*a*, between respective ones of the distal inboard attachment points 32*a* and the proximal inboard attachment points 43*a*, and coupling each of a plurality of outboard gas springs 50*b*, between respective ones of the distal outboard attachment points 32*b* and the proximal outboard attachment points 43*b*.

Referring now to FIGS. 10-13, in another embodiment, a wheel assembly 20" for coupling to an axle 21", for example, of a bicycle, rickshaw, wheelchair, lawnmower, wagon, or other lightweight vehicle. The wheel assembly 20" includes an outer rim 31", for example, surrounding the axle 21".

A tread 25" is illustratively carried by an exterior of the outer rim 31". For example, the tread 25" may include a solid non-pneumatic tread, for example, and include rubber. Of course, the tread 25" may include another material and may have a tread pattern corresponding to a particular usage.

The wheel assembly 20" also illustratively includes distal inboard attachment points 32a" coupled to the outer rim 31" and distal outboard attachment points 32h" coupled to the outer rim. More particularly, the distal inboard attachment points 32a" and the distal outboard attachment points 32h" are carried by the outer rim 31". The distal inboard and distal outboard attachment points 32a", 32h" each couple to a common attachment bracket 34" having a shape conforming to the shape of the interior of the outer rim 31" and couple a respective inboard or outboard spring 50a", 50b" and respective inboard or outboard lateral stop 44a", 44h" thereto. The respective gas spring 50a", 50b" and respective inboard or outboard lateral stop 44a", 44h" are secured to the corresponding distal inboard or outboard attachment point 32a", 32h" via a fastener 33" so that the respective inboard or outboard gas spring 50a", 50b" and inboard and outboard attachment point pivot about the fastener. In other words, for any given outboard distal attachment point 32b", whereto a corresponding outboard gas spring 50b" is coupled, an inboard lateral stop 44a" is also coupled. A single fastener 33" secures both an outboard gas spring 50b" and an inboard lateral stop 44a" to the outboard attachment point 32b" at the corresponding attachment bracket 34".

The wheel assembly 20" also illustratively includes an axle attachment assembly 40". The axle attachment assembly 40" includes a medial portion 41' to be coupled to the axle 21", and a rotationally spaced inboard arcuate arms 42a" extending outwardly from the medial portion and defining a plurality of proximal inboard attachment points 43a".

The wheel assembly 20" also illustratively includes a rotationally spaced outboard arcuate arms 42b" extending outwardly from the medial portion 41" and defining a plurality of proximal outboard attachment points 43b". Together with the inboard arcuate arms 42a", the outboard arcuate arms 42b" generally have a C-shape. Moreover, while there are illustratively three inboard and three outboard arcuate arms 42a", 42b", those skilled in the art will appreciate that there may be any number of inboard and outboard arcuate arms.

The inboard gas springs 50a" are each coupled between respective ones of the distal inboard attachment points 32a" and the proximal inboard attachment points 43a". The outboard gas springs 50b" are each coupled between respective ones of the distal outboard attachment points 32b" and the proximal outboard attachment points 43b". The inboard and outboard gas springs 50a", 50b" each have an operating stroke that defines a mechanical stop.

Each inboard and outboard gas spring 50a", 50b" may be in the form of inboard and outboard gas springs with associated integral hydraulic dampers, for example, as described above with respect to FIGS. 5-9. As will be appreciated by those skilled in the art, the gas springs with associated integral hydraulic dampers 50a", 50b" provide the suspension and provide damping. Further details of wheel assemblies including gas springs with integral dampers are describe in U.S. Patent Application Publication No. US-2020-0369079-A1, the entire contents of which are hereby incorporated by reference.

The inboard lateral stops 44a" are each coupled between a respective distal inboard attachment point 32a" and a respective proximal inboard attachment point 43a". Each inboard lateral stop 44a" is illustratively in the form of a hinge retainer, for example, defining inboard hinge retainers. Each inboard lateral stop 44a" is coupled to a same respective distal inboard attachment point 32a" as an inboard spring 50a", via the attachment bracket 34" and fastener 33", that is coupled to an adjacent rotationally spaced inboard arcuate arm 42a". As will be appreciated by those skilled in the art, the inboard lateral stops 44a" may provide increased lateral stability or may reduce or absorb increased lateral forces or side-loading. There may be any number of inboard lateral stops 44a".

Outboard lateral stops 44b" are each coupled between a respective distal outboard attachment point 32b" and a respective proximal outboard attachment point 43b". Each outboard lateral stop 44b" is illustratively in the form of a hinge retainer, for example, defining outboard hinge retainers. Each outboard lateral stop 44b" is coupled to a same respective distal outboard attachment point 32b", via the attachment bracket 34" and fastener 33", as an outboard spring 50b" that is coupled to an adjacent rotationally spaced outboard arcuate arm 42b". As will be appreciated by those skilled in the art, the outboard lateral stops 44b" may provide increased lateral stability or may reduce or absorb increased lateral forces or side-loading. There may be any number of outboard lateral stops 44b". An elastomeric body or other spacer may be between a gas spring 50a", 50b", and an inboard or outboard lateral stop 44a", 44h" to reduce friction therebetween and to further permit relative movement between the gas springs and lateral stops.

An elastomeric body 55" is carried by an interior of the outer rim 31". The elastomeric body 55" may define a mechanical stop or displacement limiter, for example, for the inboard and outboard lateral stops 44a", 44b". Other and/or additional mechanical stops may be used, for example, to limit displacement.

A method aspect is directed to a method of making a wheel assembly 20" for coupling to an axle 21". The method includes coupling a plurality of distal inboard attachment points 32a" coupled to an outer rim 31", and coupling a plurality of distal outboard attachment points 32h" to the outer rim. The method also includes coupling each of a plurality of inboard gas springs 50a" between respective ones of the plurality of distal inboard attachment points 32a" and respective one of a plurality of proximal inboard attachment points 43a" defined by of a plurality of rotationally spaced inboard arcuate arms 42a" of an axle attachment assembly 40" extending outwardly from a medial portion 41" of the axle attachment assembly. The method further includes coupling each of a plurality of outboard gas springs 50b" between respective ones of the plurality of distal outboard attachment points 32h" and respective one of a plurality of proximal inboard attachment points 43a" defined by of a plurality of rotationally spaced outboard arcuate arms 42h" of an axle attachment assembly 40" extending outwardly from a medial portion 41" of the axle attachment assembly.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wheel assembly for coupling to an axle comprising:
an outer rim;

a plurality of distal inboard attachment points coupled to the outer rim, and a plurality of distal outboard attachment points coupled to the outer rim;

an axle attachment assembly comprising a medial portion to be coupled to the axle, a plurality of rotationally spaced inboard arcuate arms extending outwardly from the medial portion and defining a plurality of proximal inboard attachment points, and a plurality of rotationally spaced outboard arcuate arms arcing in a direction opposite the plurality of rotationally spaced inboard arcuate arms, extending outwardly from the medial portion and defining a plurality of proximal outboard attachment points;

a plurality of inboard gas springs, each coupled between respective ones of the distal inboard attachment points and the proximal inboard attachment points; and a plurality of outboard gas springs, each coupled between respective ones of the distal outboard attachment points and the proximal outboard attachment points.

2. The wheel assembly of claim 1 further comprising a plurality of inboard lateral stops each coupled between a respective distal inboard attachment point and a respective proximal inboard attachment point.

3. The wheel assembly of claim 2 wherein the plurality of inboard lateral stops are each coupled to a same respective distal inboard attachment point as an inboard gas spring that is coupled to an adjacent rotationally spaced inboard arcuate arm.

4. The wheel assembly of claim 2 wherein the plurality of inboard lateral stops comprises a plurality of inboard hinge retainers.

5. The wheel assembly of claim 1 further comprising a plurality of outboard lateral stops each coupled between a respective distal outboard attachment point and a respective proximal outboard attachment point.

6. The wheel assembly of claim 5 wherein the plurality of outboard lateral stops are each coupled to a same respective distal outboard attachment point as an outboard gas spring that is coupled to an adjacent rotationally spaced outboard arcuate arm.

7. The wheel assembly of claim 5 wherein the plurality of outboard lateral stops comprises a plurality of outboard hinge retainers.

8. The wheel assembly of claim 1 further comprising an elastomeric body carried by an interior of the outer rim.

9. The wheel assembly of claim 1 wherein the plurality of inboard and outboard gas springs comprises a plurality of inboard and outboard gas springs with associated integral hydraulic dampers operatively coupled between the axle attachment assembly and the outer rim to provide a suspension for relative movement therebetween.

10. The wheel assembly of claim 9 wherein the plurality of inboard and outboard gas springs and associated integral hydraulic dampers each comprises:

a first cylinder body and a second cylinder body slidable therein;

a first seal carried by an end of the second cylinder body defining first and second gas chambers within the first cylinder body;

a shaft extending within the first cylinder body and into the second cylinder body defining a hydraulic fluid chamber within the second cylinder body; and an enlarged orifice body coupled to the shaft defining a hydraulic damper with the second cylinder body.

11. A wheel assembly for coupling to an axle comprising:

an outer rim;

a plurality of distal inboard attachment points coupled to the outer rim, and a plurality of distal outboard attachment points coupled to the outer rim;

an axle attachment assembly comprising a medial portion to be coupled to the axle, a plurality of rotationally spaced inboard arcuate arms extending outwardly from the medial portion and defining a plurality of proximal inboard attachment points, and a plurality of rotationally spaced outboard arcuate arms arcing in a direction opposite the plurality of rotationally spaced inboard arcuate arms, extending outwardly from the medial portion and defining a plurality of proximal outboard attachment points;

a plurality of inboard lateral stops each coupled between a respective distal inboard attachment point and a respective proximal inboard attachment point;

a plurality of outboard lateral stops each coupled between a respective distal outboard attachment point and a respective proximal outboard attachment point;

a plurality of inboard gas springs, each coupled between respective ones of the distal inboard attachment points and the proximal inboard attachment points; and a plurality of outboard gas springs, each coupled between respective ones of the distal outboard attachment points and the proximal outboard attachment points.

12. The wheel assembly of claim 11 wherein the plurality of inboard lateral stops are each coupled to a same respective distal inboard attachment point as an inboard gas spring that is coupled to an adjacent rotationally spaced inboard arcuate arm.

13. The wheel assembly of claim 11 wherein the plurality of inboard lateral stops comprises a plurality of inboard hinge retainers.

14. The wheel assembly of claim 11 wherein the plurality of outboard lateral stops are each coupled to a same respective distal outboard attachment point as an outboard gas spring that is coupled to an adjacent rotationally spaced outboard arcuate arm.

15. The wheel assembly of claim 11 wherein the plurality of outboard lateral stops comprises a plurality of outboard hinge retainers.

16. The wheel assembly of claim 11 further comprising an elastomeric body carried by an interior of the outer rim.

17. The wheel assembly of claim 11 wherein the plurality of inboard and outboard gas springs comprises a plurality of inboard and outboard gas springs with associated integral hydraulic dampers operatively coupled between the axle attachment assembly and the outer rim to provide a suspension for relative movement therebetween.

18. A method of making a wheel assembly for coupling to an axle comprising:

coupling a plurality of distal inboard attachment points to an outer rim, and coupling a plurality of distal outboard attachment points to the outer rim;

coupling each of a plurality of inboard gas springs between respective ones of the plurality of distal inboard attachment points and respective ones of a plurality of proximal inboard attachment points defined by a plurality of rotationally spaced inboard arcuate arms of an axle attachment assembly extending outwardly from a medial portion of the axle attachment assembly; and coupling each of a plurality of outboard gas springs between respective ones of the plurality of distal outboard attachment points and respective ones of a plurality of proximal outboard attachment points defined by a plurality of rotationally spaced outboard arcuate arms of the axle attachment assembly extending outwardly from a medial portion of the axle attachment assembly arcing in a direction opposite the plurality of rotationally spaced inboard arcuate arms.

19. The method of claim 18 further comprising coupling each of a plurality of inboard lateral stops between a respective distal inboard attachment point and a respective proximal inboard attachment point.

20. The method of claim 19 wherein the plurality of inboard lateral stops are each coupled to a same respective distal inboard attachment point as an inboard gas spring that is coupled to an adjacent rotationally spaced inboard arcuate arm.

21. The method of claim 18 further comprising coupling each of a plurality of outboard lateral stops between a respective distal outboard attachment point and a respective proximal outboard attachment point.

22. The method of claim 19 wherein the plurality of outboard lateral stops are each coupled to a same respective distal outboard attachment point as an outboard gas spring that is coupled to an adjacent rotationally spaced outboard arcuate arm.

23. The method of claim 18 further comprising coupling an elastomeric body to an interior of the outer rim.

\* \* \* \* \*